United States Patent [19]

Jehan et al.

[11] Patent Number: 5,075,716
[45] Date of Patent: Dec. 24, 1991

[54] APPARATUS AND METHOD FOR PRECISELY EXPOSING RADIATION SENSITIVE MATERIALS

[75] Inventors: Howard P. Jehan, Honeoye Falls; Eugene R. Clemons, Palmyra; Thomas W. McKeehan, Fairport; Brian A. Reed, Rochester, all of N.Y.

[73] Assignee: Eastman Kodak Company, Rochester, N.Y.

[21] Appl. No.: 621,139

[22] Filed: Nov. 29, 1990

[51] Int. Cl.⁵ .................................... G03B 27/72
[52] U.S. Cl. .................................... 355/1; 355/38; 355/68; 355/77
[58] Field of Search ............ 355/1, 38, 77; 358/200; 354/76; 350/96.1, 96.23, 96.25, 96.29

[56] References Cited

U.S. PATENT DOCUMENTS

| | | | |
|---|---|---|---|
| 3,043,179 | 7/1962 | Dunn | 88/1 |
| 3,492,070 | 1/1970 | Zahn | 355/37 |
| 3,560,084 | 2/1971 | Limberger | 355/1 |
| 3,636,851 | 1/1972 | Furst | 95/89 |
| 3,658,407 | 4/1972 | Kitano et al. | 355/1 X |
| 3,801,181 | 4/1974 | Kitano et al. | 350/96 |
| 3,942,866 | 3/1976 | Roaman | 350/96 |
| 4,331,380 | 5/1982 | Rees et al. | 355/1 X |
| 4,332,439 | 6/1982 | Lubbers et al. | 350/320 |
| 4,410,895 | 10/1983 | Houston et al. | 346/1.1 |
| 4,591,231 | 5/1986 | Kaiser et al. | 350/96 |
| 4,692,607 | 9/1987 | LaBelle et al. | 250/205 |
| 4,721,851 | 1/1988 | Kogure | 358/200 |
| 4,754,300 | 6/1988 | Fukae | 355/235 |
| 4,922,089 | 5/1990 | McGuire et al. | 250/205 |
| 4,975,729 | 12/1990 | Gordon | 355/1 |

Primary Examiner—L. T. Hix
Assistant Examiner—D. Rutledge
Attorney, Agent, or Firm—Charles E. Snee, III

[57] ABSTRACT

Radiant energy is directed from a source (14,16) to an illumination plane (28) where the light receiving ends of groups (36) of optic fibers are arranged in coplanar striations (100), after which the radiant energy passes through the groups of optic fibers into individual exposure columns (40) and on to an exposure plane (42) where a radiation sensitive sample is exposed in individual areas to different, readily adjustable levels of illuminance from each of the groups of optic fibers.

56 Claims, 5 Drawing Sheets

APPARATUS AND METHOD FOR PRECISELY EXPOSING RADIATION SENSITIVE MATERIALS

TECHNICAL FIELD

The present invention concerns methods and apparatus for exposing radiation sensitive materials. More particularly, the invention concerns sensitometric methods and apparatus in which photosensitive papers or films are exposed in separate areas to increasing illuminance. Then, the exposed papers or films are processed and analyzed to determine the density of the image produced by the exposure in each area, the density being a measure of the acceptability of the papers or films.

BACKGROUND ART

Apparatus known as sensitometers have been used for many years to expose samples of photographic papers and films in a very precise manner for subsequent densitometric analysis in which the density is measured of the image produced by such exposure. Such apparatus and the associated methods must be capable of exposing the photosensitive sample with a high degree of precision, accuracy and repeatability. More particularly, excellent control must be achieved for factors such as the illuminance at the exposure plane or the amount of radiant energy per unit area of the sample at a given point in time, the exposure time or the period during which the sample is exposed to radiant energy of such illuminance, the color temperature or spectral distribution of the radiant energy reaching the sample and the uniformity of the exposure across the surface of the sample. In the testing of photographic films and papers, a further concern is to be able to test the sample at illuminances, exposure times and color temperatures which closely approximate those to which end users subject the actual products. For testing purposes incident to manufacture of such films and papers, these three aspects of the exposure must be controlled more precisely than ever would be required by the end user. To maintain high productivity, some end users want to expose the product at faster and faster shutter times. To test a sample at such exposure times, the illuminance at the exposure plane must be increased in inverse proportion to the exposure time if the sample is to receive the same total amount of radiant energy as at a slower shutter speed. The flexibility to meet such changing test requirements has been largely absent from known sensitometric systems in which radiant energy requirements are high.

In known sensitometers, the radiant energy source typically is located far enough away from the sample that the sample is essentially uniformly illuminated and still receives enough radiant energy for proper exposure. Exposure times are created by a variety of shutter mechanisms, located either very close to the light source or very close to the sample. The radiant energy reaching the sample is attenuated through a test object or wedge or step tablet located between the source and the sample, with the sample usually pressed flat against the test object. Such test objects are made from a material transparent to the radiant energy to which have been added graded amounts of some spectrally neutral attenuating material, such as carbon or Inconel in the case of visible light, often in twenty-one individual steps measuring about 10 mm by 10 mm (0.39 by 0.39 in). Thus, radiant energy passing through the test object is attenuated by the added material before striking the sample. Often, the exposed and processed sample has an exposed area measuring about 210 mm by 10 mm (8.27 by 0.39 in) which is made up of twenty-one contiguous steps, each step in the test object being made to attenuate radiant energy differently than its neighbors. Such test objects typically attenuate visible light by 0.10 log, 0.15 log or 0.20 log increments to form what are called 0-2, 0-3 and 0-4 gradient test objects, respectively.

While such sensitometer apparatus and methods have long been used with acceptably good results, a variety of problems have been identified. Because of the way such test objects are made, it is difficult to set with precision the degree of attenuation in each step and it is not possible to change the attenuation in any step once the object has been made. For the same reason, it is difficult to make any two objects just alike. In addition, the exposure within a given step of such an object is occasionally found to be unacceptably non-uniform. The amount of radiant energy striking the test object and sample is limited by how close the light source can be placed to the sample and still uniformly illuminate the test object. The shuttering systems used in known apparatus and methods are limited in their ability to produce very short shutter times without sacrificing efficiency. For example, shorter exposure times are achievable if each step is exposed individually, which decreases precision and slows down the process. While different test objects can be used to provide different stages of exposure, each variant test object must be custom specified and fabricated, making it virtually impossible to expose a product in a non-conventional manner without an extended period of preparation. Such known test objects are easily broken or scratched and tend to accumulate dust which degrades the exposure. To maintain a desired color temperature, the voltage of the lamp is adjusted, which changes the illuminance at the exposure plane, making it necessary to move the sample closer to or further from the light source.

One prior art sensitometer known to the present inventors includes a logarithmically proportioned bundle of optic fibers to direct light from a source to several areas of a strip of sensitized material. The light source comprises a lamp, a spherical reflector and a condenser lens. An elliptical reflector also has been used without the condenser lens. A defocused image of the lamp filament is projected at the light receiving end of the optic fiber bundle. The light is spectrally modified with color balancing filters and an infrared filter. A shutter controls the exposure time of the light. Downstream of the light receiving end, the bundle is divided into a plurality of smaller fixed bundles of differing numbers of fibers; so that, each of the smaller bundles transmits a different amount of radiant energy. The number of fibers in each of the smaller bundles is such as to provide a given set of illuminance levels at an exposure plane. The exact illuminance level desired is achieved by correctly positioning a variable neutral density attenuator at the entrance to a light integrating chamber or column for each smaller bundle of fibers. Some of the smaller bundles also have a color filter adjacent their attenuator. The light output from each smaller bundle is directed through such attenuator or filter or both and into the integrating chamber. The fibers are attached at a fixed position near the entrance to the chamber and the light emitted from each smaller bundle is integrated through multiple reflections along the interior length of the chamber whose walls are painted white.

SUMMARY OF THE INVENTION

An objective of the present invention is to provide an apparatus and method for exposing photographic materials in which the illuminance at each area of the sample can be individually, precisely adjusted.

Another objective of the present invention is to provide such an apparatus and method in which the exposure in each area is of high uniformity.

Still another objective of the present invention is to provide such an apparatus and method in which an essentially non-uniform light source can be used to provide essentially uniform exposure of each area of the sample.

Yet another objective of the present invention is to provide such an apparatus and method in which losses of light between the source and the sample are minimized.

A still further objective of the present invention is to provide such an apparatus and method in which very short shutter times are achievable with high accuracy and repeatability.

Another objective of the present invention is to provide such an apparatus and method in which unusual or non-standard exposure gradients are readily achievable.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The apparatus of the invention is well suited for precisely exposing radiation sensitive webs such as photographic films and papers. One embodiment comprises means for positioning a sample of such webs at an exposure plane; a source of radiant energy; a plurality of elongated optic fibers having their light receiving ends arranged substantially in an illumination plane facing the source, their other, light emitting ends being arranged in groups of differing numbers of fibers with the other ends of the optic fibers of each group facing the exposure plane; and means for adjusting the position of the other ends of each group relative to the exposure plane to obtain a desired illuminance on such sample opposite the other ends of each of the groups of optic fibers. The optic fibers permit an efficient, controlled distribution of light to the sample. The source of radiant energy preferably comprises an incandescent lamp and an elliptical reflector positioned on the opposite side of the lamp from the illumination plane, the illumination plane being positioned near a focus of the elliptical reflector. Color correction filters may be provided between the source and the illumination plane.

In the preferred embodiment of the invention, the light receiving ends of the optic fibers of each of the groups are arranged at the illumination plane in striations, the number of optic fibers in each group being chosen to provide a progression, preferably logarithmic, of the illuminance at the exposure plane from group to group. The striations may be contiguous or not and may be arranged in non-parallel or fan-shaped arrays. A shutter means is provided between the source and the illumination plane and the shutter may comprise a rotatable sector wheel or a movable blade, depending on the speed of exposure desired. Specially configured masks may be positioned at the illumination plane for blocking radiation from portions of the striations to expand the range of such logarithmic progression from, for example, a 0-3 to a 0-4 gradient. Alternatively, such masks may be configured to contract the range of the logarithmic progression from, for example, a 0-3 to a 0-2 gradient. To properly adjust the apparatus, means may be provided for measuring the illuminance at the exposure plane from the optic fibers of each group, the means for adjusting being actuated in response to such means for measuring. Preferably, the means for adjusting comprises a plurality of elongated chambers, one for each of the groups of fibers, each chamber having an end opening toward the exposure plane; a plurality of fixture means, one slidably mounted in each of the chambers, for holding the other ends coplanar within each of the groups; and means for moving the fixture means toward or away from the exposure plane to adjust the illuminance at the exposure plane.

Another embodiment of the invention comprises means for positioning a sample of such webs at an exposure plane; a source of radiant energy; a plurality of longitudinally extending optic fibers having their light receiving ends arranged substantially in an illumination plane facing the source, their other, light emitting ends being arranged in groups of differing numbers of fibers with the other ends of the optic fibers of each group facing the exposure plane; and means for eliminating off-axis radiation issuing from the other ends of each of the groups to provide substantially uniform radiation on such sample opposite the other ends of each of the groups of optic fibers. The means for eliminating off-axis radiation preferably comprises a plurality of elongated chambers, one for each of the groups, each chamber having an end opening toward the exposure plane; a plurality of fixture means, one mounted in each of the chambers, for holding the other ends coplanar within each of the groups; and coating means on the walls of the chambers between the other ends and the exposure plane for absorbing off axis radiation issuing from the other ends. In combination with such coating means, the means for eliminating off-axis radiation may comprise a plurality of elongated chambers, one for each of the groups, each chamber having an end opening toward the exposure plane; a plurality of fixture means, one mounted in each of the chambers, for holding the other ends coplanar within each of the groups; and at least one transparent integrating rod positioned in each of the chambers near the end opening and extended toward the other ends of the optic fibers, the rod essentially completely filling the crossectional area of the chamber near the end opening. Preferably, the integrating rod comprises a surface facing the other ends, the surface being ground to diffuse incident radiation. In addition to such ground surface on the integrating rod, means may be positioned between the other ends and the integrating rod for diffusing radiation incident on the integrating rod. Color correction filters may be provided in each of the chambers between the other ends and the integrating rod. This embodiment of the invention may also include the other features mentioned previously for the first embodiment.

One unique feature of the invention, that the light receiving ends of the optic fibers are arranged in striations which can be precisely exposed by a shutter, also can be applied to exposures of other types of light receiving objects, such as open integrating columns, solid integrating rods and arrays of light responsive elements such as charge coupled devices. An apparatus for sequentially exposing an array of light receiving objects may comprise a source of radiant energy; a plurality of such objects arranged substantially at an illumination plane facing such source, such objects being arranged in striations; and a shutter positioned between such source and such illumination plane. The shutter may be a rotatable sector wheel or a movable blade. The exposed area of such objects in each striation may be chosen to provide a progression of the illuminance at each striation at the illumination plane. The progression may be logarithmic, as in the case of a sensitometric application, or any other type of progression. Masks may be positioned at the illumination plane for blocking radiation from portions of the striations to expand or contract the range of the progression.

In accordance with the method of the invention, radiation sensitive webs are precisely exposed by positioning a sample of such webs at an exposure plane; providing a source of radiant energy; providing a plurality of longitudinally extending optic fibers having their light receiving ends arranged substantially in an illumination plane facing the source, their other, light emitting ends being arranged in groups of differing numbers of fibers with the other ends of the optic fibers of each group facing the exposure plane; adjusting the position of the other ends of each group relative to the exposure plane to obtain a desired illuminance on such sample opposite the other ends of each of said groups of optic fibers; and exposing such sample to radiant energy issuing from the other ends. Where the source comprises an incandescent lamp and an elliptical reflector positioned on the opposite side of the lamp from the illumination plane, the method further comprises the step of positioning the illumination plane near a focus of the elliptical reflector so as to maximize illuminance at the exposure plane. Color correcting the radiant energy between the source and the illumination plane may also be included in the method.

Preferably, the method includes the steps of arranging the light receiving ends of the optic fibers of each of the groups at the illumination plane in striations, and providing shutter means between the source and the illumination plane. Preferably, the number of the fibers in each group is chosen to provide a logarithmic progression of the illuminance at the exposure plane. By masking radiation from portions of the striations, the method of the invention can expand or contract the range of such logarithmic progression. The method may also comprise the steps of measuring the illuminance from the other, light emitting ends of the optic fibers of each group and adjusting the positions of the other ends as a function of the measured illuminance. The adjusting step may comprise the steps of providing a plurality of elongated chambers, one for each of said groups, each such chamber having an end opening toward the exposure plane; providing a plurality of fixture means, one slidably mounted in each of the chambers, for holding the other ends coplanar within each of the groups; and moving the fixture means toward or away from the exposure plane to adjust the illuminance at the exposure plane.

An alternative form of the method of the invention comprises, alone or in combination with the steps described above, the steps of positioning a sample of such webs at an exposure plane; providing a source of radiant energy; providing a plurality of longitudinally extending optic fibers having their light receiving ends arranged substantially in an illumination plane facing the source, their other, light emitting ends being arranged in groups of differing numbers of fibers with the other ends of the optic fibers of each group facing the exposure plane; eliminating off-axis radiation issuing from the other ends of each of the groups to provide substantially uniform radiation on such sample opposite the other ends of each of the groups of optic fibers; and exposing such sample to the uniform radiation. The step of eliminating off-axis radiation may comprise the steps of providing a plurality of elongated chambers, one for each of said groups, each such chamber having an end opening toward the exposure plane; providing a plurality of fixture means, one mounted in each of the chambers, for holding the other ends coplanar within each of the groups; and providing at least one transparent integrating rod positioned in each of the chambers near the end opening and extended toward the other ends of the optic fibers, the rod essentially completely filling the crossectional area of the chamber near the end opening. The method may also comprise the steps of diffusing radiation incident on the integrating rod from the other ends of the optic fibers and of color correcting the radiation in each of the chambers between the other ends of the fibers and the integrating rod.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Figure 1:
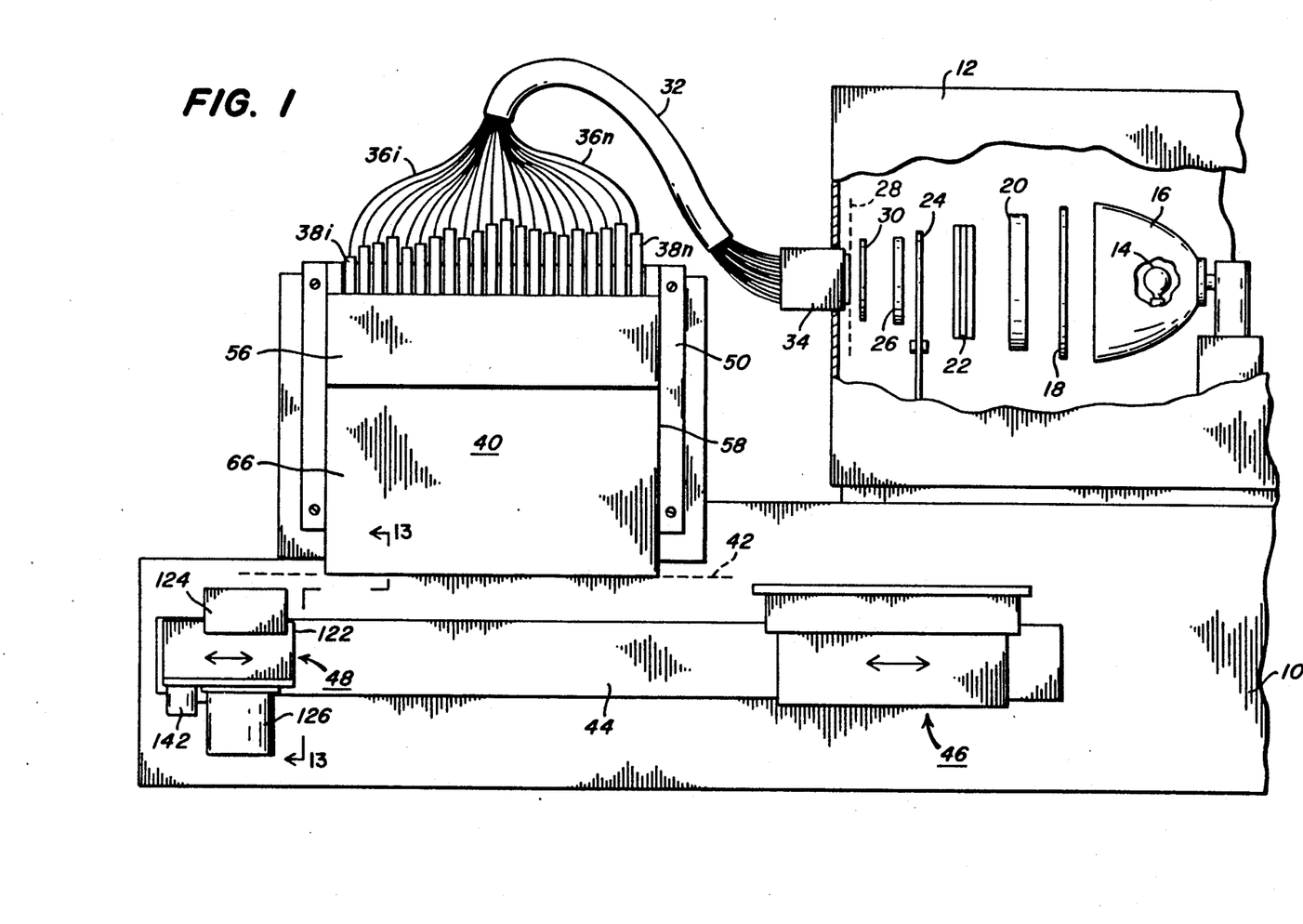
FIG. 1 shows a schematic front elevation view, partially broken away, of the apparatus according to the invention.
Figure 11:
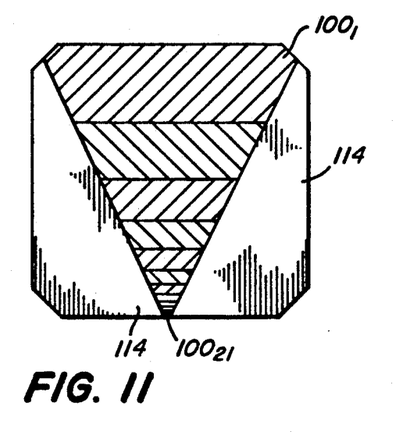
FIG. 11 shows an elevation view of the illumination plane of FIG. 9 with a mask in place which expands the range of logarithmic progression.
Figure 12:
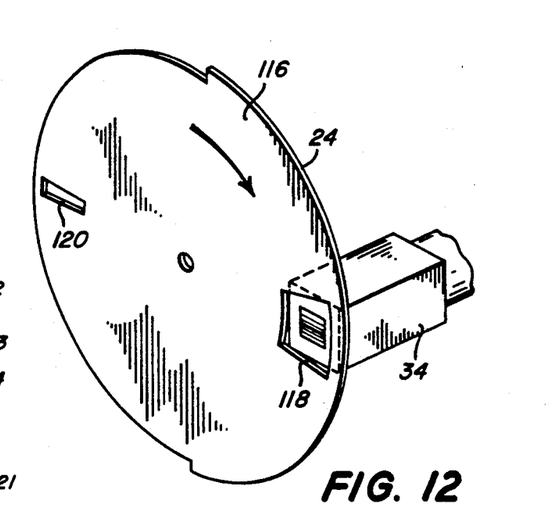
FIG. 12 shows a perspective view of the illumination plane of FIG. 6 with a rotatable sector shutter positioned in front of the illumination plane.

FIG. 1 shows an elevation view of the apparatus of the invention. A frame 10 supports a lamp housing 12 within which are located a source of radiation, such as an electric lamp 14, which is positioned at or near one focus of an elliptical reflector 16. A suitable lamp is made by the General Electric Company, DYS type, tungsten halogen, 600 watt and is used with its filament axis horizontal as viewed in FIG. 1. Such a source of radiation is capable of illuminating the light receiving ends of optic fibers with more than 1,500,000 lux. In combination with the optic fiber system for distribution of radiant energy to be described subsequently, the sensitometer of the invention can produce as many as twenty-one exposures with the highest illuminance step receiving up to 250,000 lux. This far exceeds the 50,000 lux maximum typically achievable with prior art systems. Positioned to the left or in front of lamp 14 and reflector 16 is a conventional heat absorber 18 which may comprise a rotatable carousel of absorbers of different types, as will be familiar to those skilled in the sensitometric arts. A conventional capping shutter 20 preferably is positioned in front of heat absorber 18 to shield the components in front of the capping shutter from heat and light when exposures are not needed. One or more conventional neutral density filter wheels 22 may be provided in front of capping shutter 20 and perpendicular to the axis of the lamp to permit adjustment of the spectral distribution of light passed on to the sample. In front of filter wheels 22 is positioned a rotatable sector shutter 24, as illustrated in FIG. 12; and in front of sector shutter 24 is positioned a conventional electronic shutter 26. In front of shutter 26 and just behind the illumination plane 28 may be located a mask 30 of the types shown in FIGS. 7 to 11.

Illumination plane 28 is located perpendicular to the axis of lamp 14 and at or near the other focus of reflector 16; so that, radiant energy from lamp 14 is essentially focused on that plane. Precise location at illumination plane 28 is not required unless the illuminance at that plane must be maximized for a particular exposur. In such a case, the positions of lamp 14 and reflector 16 can be adjusted. A plurality of optic fibers are gathered into a bundle 32 having an input or radiation receiving end 34 mounted in the wall of housing 12; so that, the input or radiation receiving ends of the fibers are coplanar and arranged substantially in illumination plane 28. The radiant energy incident on illumination plane 28 preferably falls within the numerical aperture of the optic fibers, to minimize unwanted dispersion of light at the light emitting ends of the fibers. At a distance from receiving end 34, the optic fibers in bundle 32 are gathered into separate groups $36_i$ to $36_n$ each having a different number of fibers, to provide a progression or gradient of the intensity of the light transmitted along each group of fibers. The light emitting end of each one of groups $36_i, 36_n$ extends into and is supported by a corresponding movable fixture $38_i$ to $38_n$ within an exposure column assembly 40, which directs light from each group toward an exposure plane 42. Assembly 40 is mounted on frame 10, preferably so that the light emitting ends of the fibers face downwardly as seen in FIG. 1, though it is within the scope of our invention to orient assembly 40 in any desired direction. The optic fibers of bundle 32 may be made from any suitable material such as LF-5, a UV enhanced glass with a numerical aperture equal to 0.50, available from the Welch Allyn Company of Skaneateles, N.Y. A bundle of such fibers with a length of approximately 91.44 cm (36 in) will transmit approximately 75% of light at 400 nm, 84% at 450 nm, 88% at 500 nm, 91% at 600 nm and 91% at 700 nm, making it eminently suitable for sensitometric applications. The radiant energy diffusing characteristics of assembly 40 and the optic fibers of bundle 32 permit illumination of plane 28 with a highly non-uniform source such as described above, while still producing highly uniform exposures at exposure plane 42.

Beneath exposure plane 42, frame 10 supports a guide rail 44 on which are mounted a sample transporting mechanism 46, illustrated schematically, and a mechanism 48 for sensing the illuminance at the exposure plane from each of groups $36_i, 36_n$ and for adjusting the positions of the light transmitting ends of each of groups $36_i, 36_n$ relative to exposure plane 42 obtain a desired level of illuminance. As will be discussed later in this specification, samples of radiation sensitive webs are placed on mechanism 46, moved beneath assembly 40 and there simultaneously exposed in separate areas to radiant energy from each of groups $36_i, 36_n$.

Figure 2:
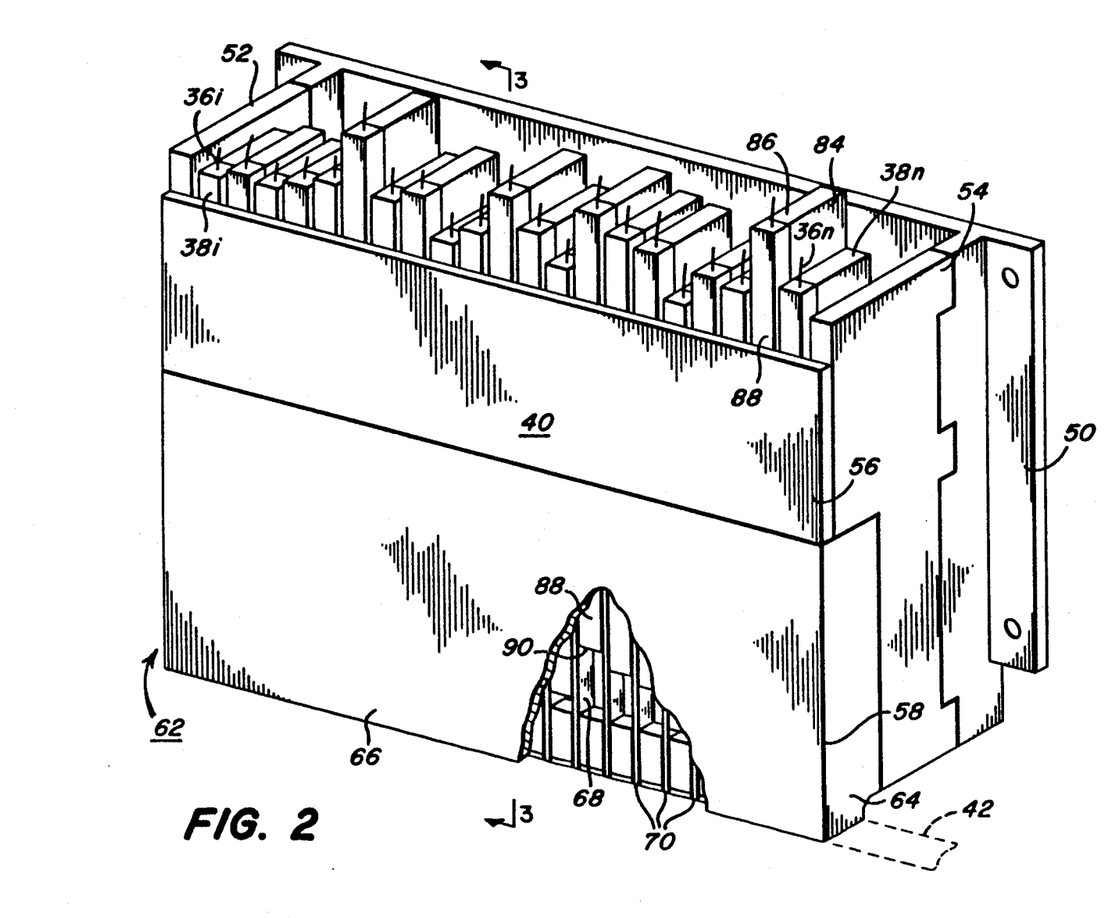
FIG. 2 shows a perspective view, partially broken away, of the exposure column assembly according to the invention.
Figure 3:
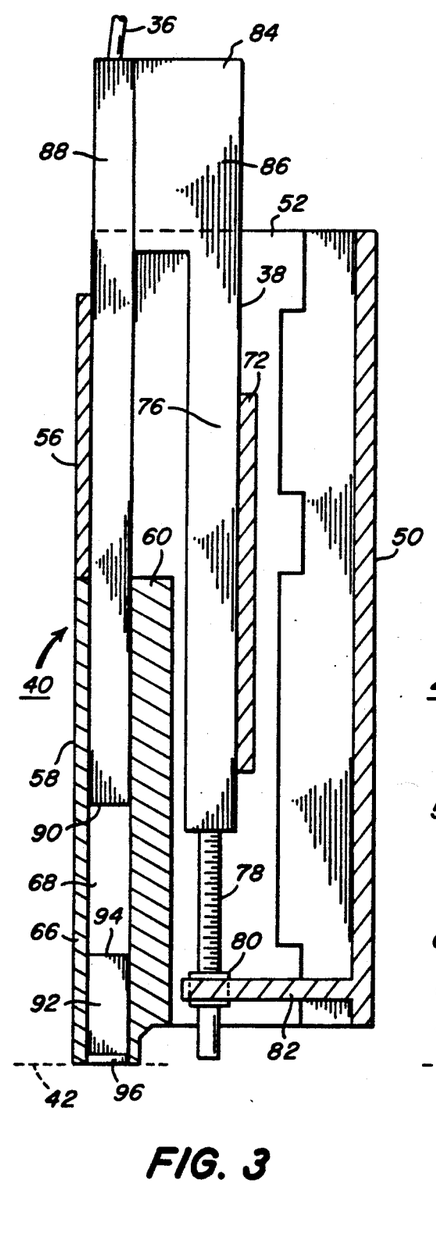
FIG. 3 shows a view taken along line 3—3 of FIG. 2, with the end of the group of optic fibers raised a considerable distance above the integrating rod.
Figure 4:
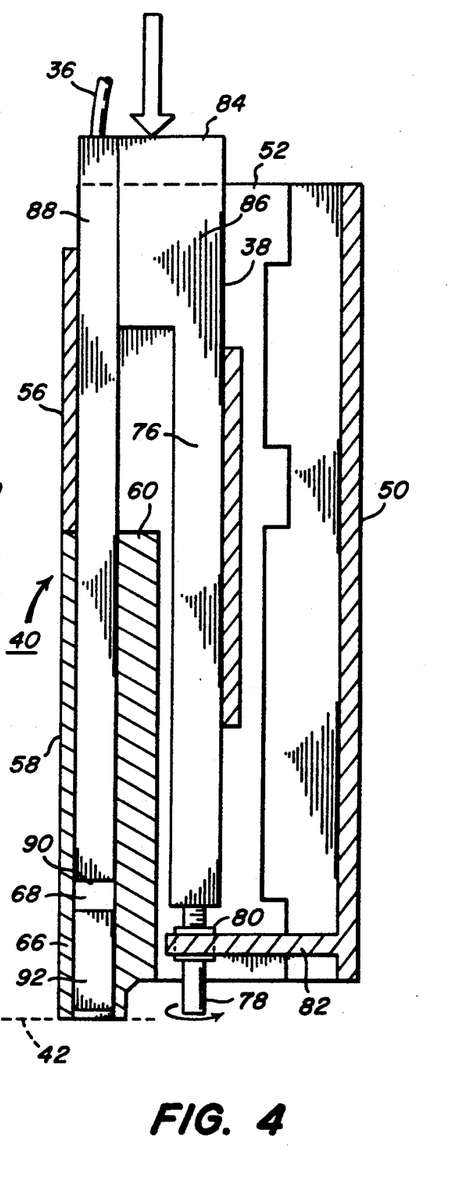
FIG. 4 shows a view taken along line 3—3 of FIG. 2, with the end of the group of optic fibers lowered closer to the integrating rod.
Figure 5:
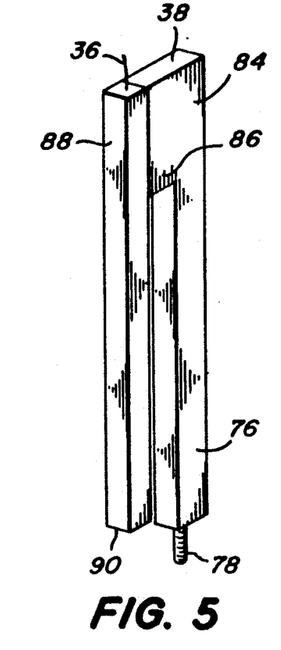
FIG. 5 shows a perspective view of the fixture which supports each group of optic fibers within the exposure column assembly.

As seen in FIGS. 2 to 4, exposure column assembly 40 comprises a rear wall member 50, a pair of side wall members 52,54 rigidly attached to and extended outwardly from rear wall member 50 and a half-height front wall member 56 rigidly joining the upper edges of side wall members 52,54. The lower front edges of side wall members 52,54 are cut away to receive an exposure column array 58 which comprises a rear wall member 60, a pair of side wall members 62,64 rigidly attached to and extended outwardly from rear wall member 60 and a front wall member 66 rigidly joining the front edges of side wall members 62,64. Within the interior space defined by wall members 60–66, a plurality of chambers 68 are defined by interior wall members 70 extending between wall members 60,66. Preferably, all of chambers 68 have the same crossectional area, which for conventional sensitometry should be approximately 10 by 12 mm (0.39 by 0.47 in). An interior guide wall member extends between side wall members 62,64 at a distance behind rear wall member 60. Slidably mounted in the space between wall members 60,72 are a plurality of fixtures 38, each of which comprises a downwardly depending leg 76 having an interior bore, not illustrated. A lead screw 78 extends into such interior bore and engages a nut, not illustrated, within the interior bore; so that, rotation of lead screw 78 will cause leg 76 to move up or down. The lower end of lead screw 78 is rotatably supported in a bearing 80 supported by a bottom wall member 82 rigidly attached to and extended outwardly from rear wall member 50. At the upper end 84 of leg 76, as illustrated in FIGS. 2 to 4, each fixture 38 comprises a laterally extending portion 86 to which is attached a rectangular support tube 88 into which one of optic fiber groups 36 extends. Each support tube 88 extends downwardly into one of chambers 68 where it closely but slidably mates with the walls of the chamber. The ends of the fibers of each group 36 are positioned substantially coplanar with the lower end 90 of each support tube 88. Optionally, a discrete color filter, not illustrated, may be provided just below lower end 90. Thus, as lead screw 78 is rotated, lower ends 90 and the ends of the fibers in each group 36 move up or down relative to exposure plane 42, thereby decreasing or increasing the illuminance at that plane, respectively. In the preferred embodiment of the invention, lower end 90 may be positioned from approximately 5.08 cm (2.0 in) to approximately 17.78 cm (7.0 in) from exposure plane 42. Since so little radiant energy is lost in the optic fibers and in assembly 40, lamp 14 is effectively much closer to exposure plane 42, thus yielding higher illuminance at the exposure plane. Since light from each lower end 90 is emitted in a conical pattern as dictated by the numerical aperture of the bundle, illuminance at a given distance from lower end 90 will vary approximately in accordance with the inverse of the square of the distance. So, depending on how far from or near to exposure plane 42 lower end 90 is positioned, less or more radiant energy reaches the exposure plane, respectively. Approximately a factor of seven change (0.85 log) in attenuation is possible with this arrangement.

Radiant energy leaving lower end 90 of each support tube 88 passes through chamber 68 to strike the sample positioned at exposure plane 42, without significant alteration of the spectral energy distribution of the radiant energy. To improve the uniformity of the exposure of the sample, it is preferred that the walls of each chamber 68 be coated with a spectrally neutral absorbing medium such as Rodel 40 Film/PSA1, a coating made by Rodel, Inc. of Newark, Del. As a result of such coating, any off axis rays leaving the lower end of each support tube 88 tend to be eliminated by absorbtion, thus improving the uniformity of the exposure. In this way, fluctuations in the uniformity of radiant energy from lamp 14 and the like can be compensated for to maintain a desired illuminance and gradient at exposure plane 42. When higher illuminance is desired at exposure plane 42, a short glass integrating rod 92 may be installed in the lower end of chamber 68. For example, rod 92 may be 2.54 cm (1.0 in) in length. To provide greater attenuation and improved uniformity, the upper end surface 94 of rod 92 should be ground or etched to provide a diffuse surface for receiving radiation from group 36 of optic fibers. Alternatively, a discrete diffusing element, not illustrated, may be provided just above surface 94. Providing rod 92 with such a diffusing element or surface increases the attenuating capability of the system to a factor of approximately 30 (1.5 log). To prevent dust from imaging on the sample, the lower end surface 96 is polished and positioned approximately 0.159 cm (0.0625 in) above exposure plane 42. However, the distance of surface 96 above exposure plane 42 must not be so large as to introduce non-uniformities. Rod 92 preferably is supported within the lower end of chamber 68 with minimal contact with the walls of the chamber, to mimimize light losses.

The illuminance at exposure plane 42 can be increased by moving lower end 90 closer to exposure plane 42. However, in the case where integrating rod 90 is not used, if lower end 90 is moved too close to exposure plane 42, the uniformity of the exposure deteriorates due to the emission properties of the optic fibers. This characteristic limits how close lower end 90 can be brought to exposure plane 42 without inducing unacceptable variations in uniformity of exposure. However, when integrating rod 92 is used, its diffuse end surface 94 functions in effect as a second, diffuse light source which helps to eliminate non-uniformities at the exposure plane. Because lower end 90 can be positioned close to diffuse end surface 94 without sacrificing uniformity at the exposure plane, the ability of the system to attenuate is dramatically improved.

Figure 6:
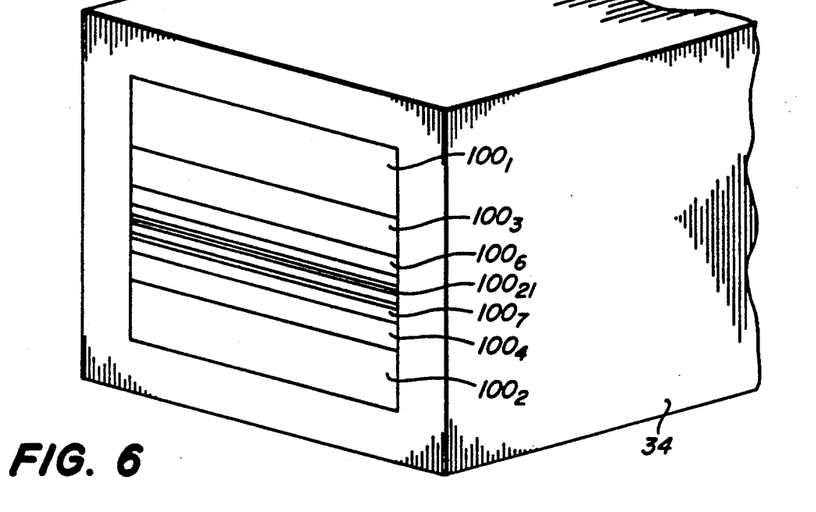
FIG. 6 shows a perspective view of the illumination plane of the bundle of optic fibers.

FIG. 6 shows a perspective view of radiation receiving end 34 of bundle 32 of optic fibers. Preferably, the ends of the fibers are arranged in a common plane which is coplanar with illumination plane 28. In conventional sensitometry, the sample preferably is exposed in twenty-one discrete areas or steps, with the illuminance at each step increasing logarithmically from the lowest to the highest value. Additional exposure steps may be provided for color patches, fiducial bars, sample numbers and the like. In the present invention, bundle 32 preferably is divided into twenty-one groups of fibers to provide a 0-3 logarithmic range with a 0.15 gradient from the group with the smallest number of fibers to the group with the largest number of fibers. Additional bundles may be provided if desired for such color patches, fiducial bars and sample numbers and for color temperature monitoring, without departing from the scope of the present invention. While it is feasible to arrange the fibers of the several groups randomly at illumination plane 28, it is preferred in accordance with the invention to arrange the fibers of the groups in a rectangular array of individual, parallel, contiguous stripes or striations $100_1$ to $100_{21}$, as indicated schematically in FIG. 6. The striations should be arranged transverse to the direction of movement of the sector shutter past illumination plane 28; so that, each striation is exposed in sequence rather than all at once. Thus, a fan shaped array of striations or non-contiguous striations are also within the scope of the invention. There are at least two advantages to this striated arrangement of the fibers of the groups. First, shuttering with a sector shutter is far more efficient since the size of each step or group as seen by the shutter is as small as practical. This ensures quicker turn-on, turn-off times. This also allows the exposing aperture of the sector shutter to be made smaller, which produces shorter exposure times for a given shutter velocity and therefore increases the range of exposures that may be selected. Second, it is possible to mask the illumination plane to change the effective gradient range of the sensitometer.

Figure 7:
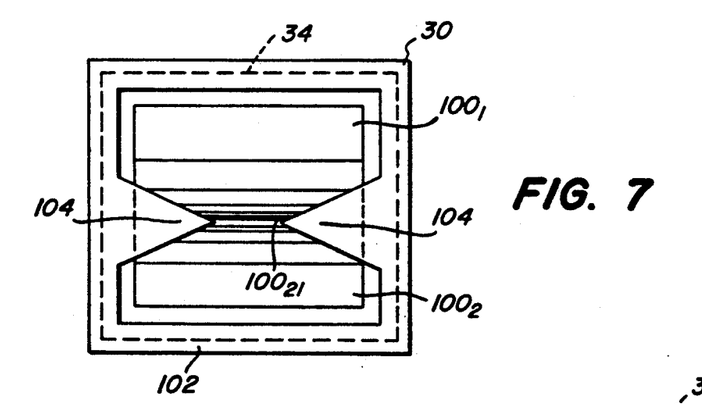
FIG. 7 shows an elevation view of the illumination plane with a mask in place which expands the range of logarithmic progression of the illuminance at the exposure plane.
Figure 8:
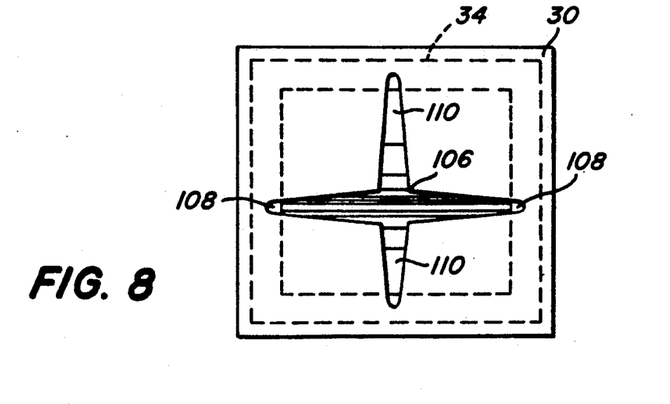
FIG. 8 shows an elevation view of the illumination plane with a mask in place which contracts the range of logarithmic progression.

FIG. 7 illustrates a geometry for mask 30 which is effective to expand the logarithmic range of the array of FIG. 6 from 0-3 to 0-4. In this case, mask 30 comprises a surrounding frame 102 having a pair of inwardly projecting triangular portions 104 which shadow or block a portion of the ends of striations 100 having the smallest numbers of fibers, thus reducing the intensity of light emitted from the partially blocked striations and expanding the logarithmic range. FIG. 8 illustrates a geometry for mask 30 which is effective to contract the logarithmic range of the array of FIG. 6 from 0-3 to 0-2. Here, mask 30 comprises a central cruciform opening 106 having tapered arms 108 which expose most of the ends of striations 100 having the smallest numbers of fibers but partially block some of the ends of the striations having larger number numbers of fibers; and tapered arms 110 which shadow or block much of the ends of striations 100 having the largest numbers of fibers. Thus, the mask of FIG. 8 reduces the light emitted from the partially blocked striations and contracts the logarithmic range. The specific geometry of triangular portions 104 and tapered arms 108,110 need only approximate that needed to give the desired expansion or contraction of the logarithmic range, since adjustment of the position of lower ends 90 permits fine tuning.

Figure 9:
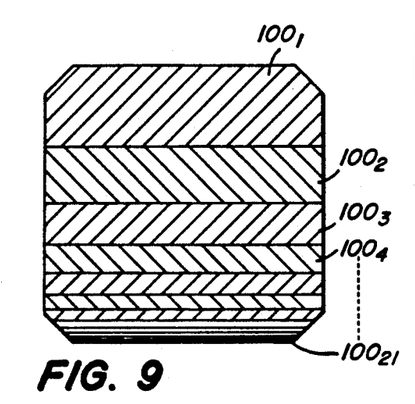
FIG. 9 shows an elevation view of the illumination plane with a different arrangement of the striations of fibers.
Figure 10:
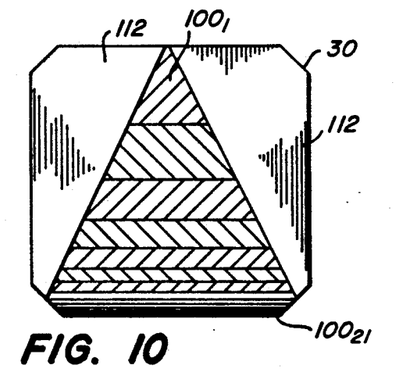
FIG. 10 shows an elevation view of the illumination plane of FIG. 9 with a mask in place which contracts the range of logarithmic progression.

FIG. 9 shows an alternate arrangement of striations 100 with the largest at the top of the array, as illustrated, and the smallest at the bottom. Other arrangements may occur to those skilled in the art but will still be within the scope of the invention if the striations are arranged transverse to the direction of movement of the shutter, as previously discussed. FIG. 10 illustrates a geometry for mask 30 which is effective to contract the logarithmic range of the array of FIG. 9 from 0-3 to 0-2. In this case, mask 30 comprises a pair of triangular portions 112 which shadow or block a portion of the ends of striations 100 having the largest numbers of fibers, thus reducing the intensity of light emitted from the partially blocked striations and contracting the logarithmic range. FIG. 11 illustrates a geometry for mask 30 which is effective to expand the logarithmic range of the array of FIG. 9 from 0-3 to 0-4. Here, mask 30 comprises a pair of triangular portions 114 which shadow or block a portion of the ends of striations 100 having the smallest numbers of fibers, thus reducing the intensity of light emitted from the partially blocked striations and expanding the logarithmic range. Regardless of which arrangement or striations is selected, mask 30 can be moved into position before illumination plane 28 using a conventional carousel mechanism, for example.

FIG. 12 illustrates schematically a sector wheel shutter 24 of the type preferred for the invention to produce particularly fast exposure times from about 0.5 msec upward. The shutter comprises a rotatable disk 116 having a large exposing aperture or sector 118 and a small exposing aperture or sector 120. Large sector 118 is sized to be slightly larger than the area of striations 100 and is used for long exposure times during which shutter 24 is stationary. Small sector 120 is sized to be slightly larger than the largest of striations 100 and is used for short exposure times during which shutter 24 is rotating. Small sector 120 takes advantage of the tiered arrangement of striations 100 by uncovering only a portion of the striations at any one time. Shutter 24 may be rotated by any suitable motor and, if necessary, a less precise, but high speed electronic shutter 26, shown schematically in FIG. 1, may be used to prevent double exposures. Of course shutter 26 may be used by itself for slower exposures of 200 msec or greater.

Striations 100 are particularly useful where groups of optic fibers are being used to transmit radiant energy from illumination plane 28 to another location. However, it is also within the scope of the invention to use the arrangement of striations and rotating sector wheel shutter of FIG. 12 for precisely controlling the transmission of radiant energy to other types of objects for receiving or transmitting radiant energy. For example, rather than an array of striations of optic fibers, a plurality of open integrating columns could be used which have slit-like input ends of varying widths and essentially constant lengths, the input ends being arranged in arrays of striations and the output ends being positioned where radiant energy is needed. Similarly, a plurality of solid transparent integrating rods could be provided, the rods having narrow rectangular input ends of varying widths and essentially constant lengths, the input ends being arranged in arrays of striations and the output ends being positioned where radiant energy is needed. The arrangement of FIG. 12 also may be used to precisely expose light responsive elements, such as charge coupled devices, arranged in arrays of striations at illumination plane 28. In any event, whether optic fibers, open integrating columns, integrating rods or charge coupled devices are arranged in such striations, the array would be exposed by the rotating sector wheel shutter in the manner and with the advantages described in the preceding paragraphs. And, in each application, masks such as shown in FIGS. 7, 8, 10 and 11 could be used with such arrays to change the range of exposure of the array.

Figure 13:
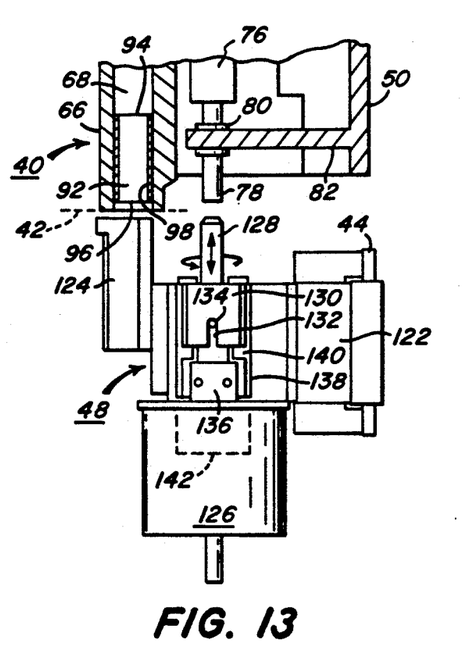
FIG. 13 shows a view taken along line 13—13 of FIG. 1, illustrating the means for adjusting the position of the other ends of the optic fibers and the means for sensing the illuminance at the exposure plane.

FIG. 13 shows a side view of the means 48 for adjusting the position of lower end 90 of support tube 88 and therefore the positions of the light emitting ends of the optic fibers, and of the means for sensing the illuminance at exposure plane 42. Guide rail 44 slidably supports a fixture 122 which in turn supports a radiation detector 124 positioned just beneath exposure plane 42 to measure the illuminance from each of groups 36 of optic fibers as fixture 122 is moved along rail 44. The output from detector 124 may be directed to a computer or visually displayed for the operator or both as the illuminance from each group is measured. Lead screws 78 may then be rotated manually or by any suitable means to reposition lower ends 90 until the desired level of illuminance is achieved. However, it is preferred that fixture 122 be provided with a motor 126 having a drive shaft fitted with an axially movable tool 128 which can be raised to engage the lower end of each lead screw 78. For this purpose, tool 128 is attached to and extended upwardly from a hollow support cylinder 130 having an axially extending slot 132 which slidably receives a pin 134 extending radially from the output shaft 136 of motor 126. Shaft 136 is telescopically received in the interior of support cylinder 130, thus permitting support cylinder 130 to be raised until tool 128 engages lead screw 78, after which rotation of shaft 136 will rotate support cylinder 130 and tool 128, due to the effect of slot 132 and pin 134. To move support cylinder 130, a support block 138 is provided which comprises a central bore at least partially surrounding the support cylinder and an inwardly projecting and at least partially circumferentially extending flange 140 which engages the lower end of the support cylinder. Preferably, support block 138 is made from a self lubricating material such as Nylon, to permit support cylinder 130 to rotate easily while contacting flange 140. Support block 138 may be mounted on guides or rails parallel to the axis of shaft 136, not illustrated, and is operatively connected to the rod end of a pneumatic cylinder 142, seen partially in FIG. 1 and in phantom in FIG. 13. Thus, when the rod of cylinder 142 is extended, support block 138 moves upward from the position shown in FIG. 13 until tool 128 engages lead screw 78. Preferably, tool 128 is provided with a tip of resilient material which frictionally engages the end of lead screw 78. Motor 126 is then operated to adjust the position of lower end 90 until the desired illuminance is achieved at the exposure plane. This mechanism provides fine adjustment of the illuminance at exposure plane 42, typically within 0.0001 log of the desired log intensity exposure gradient, a degree of precision not achievable in conventional sensitometers. This sort of calibration can be done each time the gradient of the system is changed for a different type of exposure and periodically during use for a single type of exposure to ensure that the system is not drifting out of calibration.

In operation of the apparatus, the operator loads a sample onto transporting mechanism 46 which is then moved beneath exposure column assembly 40. The sample preferably is raised against the bottom of assembly 40 by a conventional mechanism not illustrated. The appropriate filters 22 and mask 30 are moved into position in the path of radiant energy from lamp 14. Lamp 14 and one of shutters 24,26 are then actuated to make the desired exposure. If no additional exposures are to be made on the sample, it is then removed from beneath assembly 40 and the system is prepared for the next sample.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for precisely exposing radiation sensitive webs, comprising:
   means for positioning a sample of such webs at an exposure plane;
   a source of radiant energy;
   a plurality of longitudinally extending optic fibers having their one ends arranged substantially in an illumination plane facing said source, their other ends being arranged in groups of differing numbers of fibers with the other ends of the optic fibers of each group facing said exposure plane; and
   means for adjusting individually the positions of said other ends of each group relative to said exposure plane to obtain a desired illuminance at said exposure plane opposite said other ends of each of said groups of optic fibers.

2. Apparatus according to claim 1, wherein said source comprises an incandescent lamp and an elliptical reflector positioned on the opposite side of said lamp from said illumination plane, said illumination plane being positioned near a focus of said elliptical reflector.

3. Apparatus according to claim 1, further comprising color correction filters between said source and said illumination plane.

4. Apparatus according to claim 1, wherein said one ends of said optic fibers of each of said groups are arranged at said illumination plane in striations, said apparatus further comprising shutter means between said source and said illumination plane for sequentially exposing said striations.

5. Apparatus according to claim 4, wherein said shutter means comprises a rotatable sector wheel.

6. Apparatus according to claim 4, wherein said shutter means comprises a movable blade.

7. Apparatus according to claim 1, wherein said one ends of said optic fibers of each of said groups are arranged at said illumination plane in striations, the number of said fibers in each group being chosen to provide a logarithmic progression of the illuminance at said exposure plane.

8. Apparatus according to claim 7, further comprising mask means positioned at said illumination plane for blocking radiation from portions of said striations to expand the range of said logarithmic progression.

9. Apparatus according to claim 7, further comprising mask means positioned at said illumination plane for blocking radiation from portions of said striations to contract the range of said logarithmic progression.

10. Apparatus according to claim 1, further comprising means for measuring the illuminance at said exposure plane from said other ends of the optic fibers of each group, said means for adjusting being responsive to said means for measuring.

11. Apparatus according to claim 1, wherein said means for adjusting comprises:
   a plurality of elongated chambers, one for each of said groups, each said chamber having an end opening toward said exposure plane;
   a plurality of fixture means, one slidably mounted in each of said chambers, for holding said other ends coplanar within each of said groups; and
   means for moving said fixture means toward or away from said exposure plane to adjust the illuminance at said exposure plane.

12. Apparatus for precisely exposing radiation sensitive webs, comprising:
   means for positioning a sample of such webs at an exposure plane;
   a source of radiant energy;
   a plurality of longitudinally extending optic fibers having their one ends arranged substantially in an illumination plane facing said source, their other ends being arranged in groups of differing numbers of fibers with the other ends of the optic fibers of each group spaced from and faced toward said exposure plane; and
   means between said other ends and said exposure plane for eliminating off-axis radiation issuing from said other ends of each of said groups.

13. Apparatus according to claim 12, wherein said source comprises an incandescent lamp and an elliptical reflector positioned on the opposite side of said lamp from said illumination plane, said illumination plane being positioned near a focus of said elliptical reflector.

14. Apparatus according to claim 12, further comprising color correction filters between said source and said illumination plane.

15. Apparatus according to claim 12, wherein said one ends of said optic fibers of each of said groups are arranged at said illumination plane in striations, said apparatus further comprising shutter means between said source and said illumination plane for sequentially exposing said striations.

16. Apparatus according to claim 15, wherein said shutter means comprises a rotatable sector wheel.

17. Apparatus according to claim 15, wherein said shutter means comprises a movable blade.

18. Apparatus according to claim 12, wherein said one ends of said optic fibers of each of said groups are arranged at said illumination plane in striations, the number of said fibers in each group being chosen to provide a logarithmic progression of the illuminance at said exposure plane.

19. Apparatus according to claim 18, further comprising mask means positioned at said illumination plane for blocking radiation from portions of said striations to expand the range of said logarithmic progression.

20. Apparatus according to claim 18, further comprising mask means positioned at said illumination plane for blocking radiation from portions of said striations to contract the range of said logarithmic progression.

21. Apparatus according to claim 12, further comprising means for measuring the illuminance at said exposure plane from said other ends of the optic fibers of each group.

22. Apparatus according to claim 12, wherein said means for eliminating off-axis radiation comprises:
- a plurality of elongated chambers, one for each of said groups, each said chamber having an end opening toward said exposure plane;
- a plurality of fixture means, one mounted in each of said chambers, for holding said other ends coplanar within each of said groups; and
- coating means on the walls of said chambers between said other ends and said exposure plane for absorbing off axis radiation issuing from said other ends.

23. Apparatus according to claim 12, wherein said means for eliminating off-axis radiation comprises:
- a plurality of elongated chambers, one for each of said groups, each said chamber having an end opening toward said exposure plane;
- a plurality of fixture means, one mounted in each of said chambers, for holding said other ends coplanar within each of said groups; and
- at least one transparent integrating rod positioned in each of said chambers near said end opening and extended toward said other ends, said rod essentially completely filling the crossectional area of said chamber near said end opening.

24. Apparatus according to claim 23 wherein said integrating rod comprises a surface facing said other ends, said surface being ground to diffuse incident radiation.

25. Apparatus according to claim 23, further comprising means positioned between said other ends and said integrating rod for diffusing radiation incident on said integrating rod from said other ends.

26. Apparatus according to claim 23, further comprising coating means on the walls of said chambers between said other ends and said integrating rod for absorbing off axis radiation issuing from said other ends.

27. (Amended) Apparatus according to claim 23, further comprising at least one color correction filter in each of said chambers between said other ends and said integrating rod.

28. A method for precisely exposing radiation sensitive webs, comprising the steps of:
- positioning a sample of such webs at an exposure plane;
- providing a source of radiant energy;
- providing a plurality of longitudinally extending optic fibers having their one ends arranged substantially in an illumination plane facing said source, their other ends being arranged in groups of differing numbers of fibers with the other ends of the optic fibers of each group facing said exposure plane;
- adjusting the position of said other ends of each group relative to said exposure plane to obtain a desired illuminance at said exposure plane opposite said other ends of each of said groups of optic fibers; and
- exposing such sample to radiant energy issuing from said other ends.

29. A method according to claim 28, wherein said source comprises an incadescent lamp and an elliptical reflector positioned on the opposite side of said lamp from said illumination plane, said method further comprising the step of positioning said illumination plane at a focus of said elliptical reflector.

30. A method according to claim 28, further comprising the step of color correcting said radiant energy between said source and said illumination plane.

31. A method according to claim 28, further comprising the steps of arranging said one ends of said optic fibers of each of said groups at said illumination plane in striations, and providing shutter means between said source and said illumination plane.

32. A method according to claim 28, wherein said one ends of said optic fibers of each of said groups are arranged at said illumination plane in striations, the number of said fibers in each group being chosen to provide a logarithmic progression of the illuminance at said exposure plane.

33. A method according to claim 32, further comprising the step of masking radiation from portions of said striations to expand the range of said logarithmic progression.

34. A method according to claim 32, further comprising the step of masking radiation from portions of said striations to contract the range of said logarithmic progression.

35. A method according to claim 28, further comprising the steps of measuring the illuminance at said exposure plane from said other ends of the optic fibers of each group and adjusting the positions of said other ends as a function of said illuminance.

36. A method according to claim 28, wherein said adjusting step comprises the steps of:
- providing a plurality of elongated chambers, one for each of said groups, each said chamber having an end opening toward said exposure plane;
- providing a plurality of fixture means, one slidably mounted in each of said chambers, for holding said other ends coplanar within each of said groups; and
- moving said fixture means toward or away from said exposure plane to adjust the illuminance at said exposure plane.

37. A method for precisely exposing radiation sensitive webs, comprising the steps of:
- positioning a sample of such webs at an exposure plane;
- providing a source of radiant energy;
- providing a plurality of longitudinally extending optic fibers having their one ends arranged substantially in an illumination plane facing said source, their other ends being arranged in groups of differing numbers of fibers with the other ends of the optic fibers of each group spaced from and faced toward said exposure plane;
- between said other ends and said exposure plane, eliminating off-axis radiation issuing from said other ends of each of said groups; and
- exposing such sample.

38. A method according to claim 37, wherein said source comprises an incandescent lamp and an elliptical reflector positioned on the opposite side of said lamp from said illumination plane, further comprising the step of positioning said illumination plane near a focus of said elliptical reflector.

39. A method according to claim 37, further comprising the step of color correcting said radiant energy between said source and said illumination plane.

40. A method according to claim 37, further comprising the steps of arranging said one ends of said optic fibers of each of said groups at said illumination plane in striations and providing shutter means between said source and said illumination plane for sequentially exposing said striations.

41. A method according to claim 37, further comprising the step of arranging said one ends of said optic fibers of each of said groups at said illumination plane in striations, the number of said fibers in each group being chosen to provide a logarithmic progression of the illuminance at said exposure plane.

42. A method according to claim 41, further comprising the step of masking radiation from portions of said striations to expand the range of said logarithmic progression.

43. A method according to claim 41, further comprising the step of masking radiation from portions of said striations to contract the range of said logarithmic progression.

44. A method according to claim 37, further comprising the step of measuring the illuminance at said exposure plane from said other ends of the optic fibers of each group.

45. A method according to claim 37, wherein said step of eliminating off-axis radiation comprises the steps of:
providing a plurality of elongated chambers, one for each of said groups, each said chamber having an end opening toward said exposure plane;
providing a plurality of fixture means, one mounted in each of said chambers, for holding said other ends coplanar within each of said groups; and
absorbing off axis radiation between said other ends and said exposure plane.

46. A method according to claim 37, wherein said step of eliminating off-axis radiation comprises the steps of:
providing a plurality of elongated chambers, one for each of said groups, each said chamber having an end opening toward said exposure plane;
providing a plurality of fixture means, one mounted in each of said chambers, for holding said other ends coplanar within each of said groups; and
providing at least one transparent integrating rod positioned in each of said chambers near said end opening and extended toward said other ends, said rod essentially completely filling the crossectional area of said chamber near said end opening.

47. A method according to claim 46, further comprising the step of diffusing radiation incident on said integrating rod from said other ends.

48. A method according to claim 46, further comprising the step of absorbing off axis radiation issuing from said other ends.

49. A method according to claim 37, further comprising the step of color correcting said radiation in each of said chambers between said other ends and said integrating rod.

50. Apparatus for sequentially exposing an array of light receiving objects, comprising:
a source of radiant energy;
a plurality of such objects arranged substantially at an illumination plane facing said source, said objects being arranged in striations, the exposed area of such objects in each striation being chosen to provide a progression of the illuminance at each striation at said illumination plane; and
shutter means positioned between said source and said illumination plane for sequentially illuminating said striations.

51. Apparatus according to claim 50, wherein said shutter means comprises a rotatable sector wheel.

52. Apparatus according to claim 50, wherein said shutter means comprises a movable blade.

53. Apparatus according to claim 50, wherein said progression is logarithmic, further comprising mask means positioned at said illumination plane for blocking radiation from portions of said striations to expand the range of said logarithmic progression.

54. Apparatus according to claim 50, wherein said progression is logarithmic, further comprising mask means positioned at said illumination plane for blocking radiation from portions of said striations to contract the range of said logarithmic progression.

55. Apparatus according to claim 50, further comprising mask means positioned at said illumination plane for blocking radiation from portions of said striations to expand the range of said progression.

56. Apparatus according to claim 50, further comprising mask means positioned at said illumination plane for blocking radiation from portions of said striations to contract the range of said progression.

* * * * *